United States Patent
Wang

(10) Patent No.: US 10,136,430 B2
(45) Date of Patent: Nov. 20, 2018

(54) DATA TRANSMISSION USING FREQUENCY RESOURCES DETERMINED FROM FREQUENCY RESOURCE NUMBERS

(71) Applicant: Huawei Technologies Co., Ltd., Shenzhen, Guangdong (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/329,935

(22) PCT Filed: Aug. 1, 2014

(86) PCT No.: PCT/CN2014/083565
§ 371 (c)(1),
(2) Date: Jan. 27, 2017

(87) PCT Pub. No.: WO2016/015339
PCT Pub. Date: Feb. 4, 2016

(65) Prior Publication Data
US 2017/0251470 A1    Aug. 31, 2017

(51) Int. Cl.
*H04W 72/04*    (2009.01)
*H04W 72/02*    (2009.01)

(52) U.S. Cl.
CPC ....... *H04W 72/0446* (2013.01); *H04W 72/02* (2013.01); *H04W 72/04* (2013.01); *H04W 72/0453* (2013.01)

(58) Field of Classification Search
None
See application file for complete search history.

(56) References Cited

U.S. PATENT DOCUMENTS

| 2015/0180631 A1 | 6/2015 | Zhang |
| 2015/0222401 A1 | 8/2015 | Xu et al. |
| 2016/0095131 A1* | 3/2016 | Seo ..................... H04W 72/085 370/329 |

FOREIGN PATENT DOCUMENTS

| CN | 103428679 A | 12/2013 |
| CN | 103686691 A | 3/2014 |
| CN | 103686861 A | 3/2014 |
| WO | 2014036965 A1 | 3/2014 |

OTHER PUBLICATIONS

Fodor, Gabor, et al., "Design Aspects of Network Assisted Device-to-Device Communications," IEEE Communications Magazine, Mar. 2012, 8 pages.
Sony, "D2D Resource Pool and Scheduling Assignments," 3GPP TSG-RAN WG1 Meeting #76bis, R1-141571, Shenzhen, China, Mar. 31-Apr. 4, 2014, 5 pages.

* cited by examiner

*Primary Examiner* — Anh Ngoc M Nguyen

(57) ABSTRACT

Embodiments of the present invention provide a data transmission method and user equipment, where the method includes: sending, by first user equipment, an indication signal, where the indication signal indicates frequency resource numbers of one or more physical resources (S110); determining, by the first user equipment according to the frequency resource numbers, a frequency resource occupied by a data signal (S120); and sending, by the first user equipment, the data signal by using the frequency resource (S130). According to the embodiments of the present invention, a frequency diversity gain can be obtained.

16 Claims, 3 Drawing Sheets

DATA TRANSMISSION USING FREQUENCY RESOURCES DETERMINED FROM FREQUENCY RESOURCE NUMBERS

CROSS REFERENCE TO RELATED APPLICATIONS

The present application claims priority under 35 U.S.C. § 365 to International Patent Application No. PCT/CN2014/083565 filed Aug. 1, 2014, which is incorporated herein by reference into the present disclosure as if fully set forth herein.

TECHNICAL FIELD

The present invention relates to the communications field, and more specifically, to a data transmission method and user equipment.

BACKGROUND

A device to device proximity service (English full name: Device to Device Proximity Service, D2D ProSe for short) between user equipment (English full name: User Equipment, UE for short) has become a hot issue in a Long Term Evolution (English full name: Long Term Evolution, LTE for short) system.

D2D ProSe involves a data signal and an indication signal. The indication signal is used to indicate a physical resource occupied by the data signal, and the data signal is used to carry data. However, in an existing LTE communications system, the indication signal can randomly indicate only a frequency resource occupied by the data signal, and therefore, frequency selective fading cannot be effectively avoided, and a frequency diversity gain cannot be obtained.

SUMMARY

Embodiments of the present invention provide a data transmission method and user equipment, so as to obtain a frequency diversity gain.

According to a first aspect, a data transmission method is provided, including: sending, by first user equipment, an indication signal, for example, a scheduling assignment (English full name: Scheduling Assignment, SA for short) signal, where the indication signal indicates frequency resource numbers of one or more physical resources; determining, by the first user equipment according to the frequency resource numbers, a frequency resource (that is, a frequency resource number) occupied by a data signal; and sending, by the first user equipment, the data signal by using the frequency resource.

With reference to the first aspect, in a first possible implementation manner of the first aspect, the determining, by the first user equipment according to the frequency resource numbers, a frequency resource occupied by the data signal includes: determining, by the first user equipment according to a formula $\tilde{n}_{PRB}(i)=\mathrm{mod}(\tilde{n}_{VRB}+f_{hop}(i)\cdot N_{RB}^{sb}+((N_{RB}^{sb}-1)-2(\tilde{n}_{VRB} \bmod N_{RB}^{sb}))\cdot f_m(i), N_{RB}^{sb}\cdot N_{sb})$, a frequency resource number $\tilde{n}_{PRB}(i)$ occupied by the data signal, where: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{sb}^{RB}$ is a quantity of physical resources included in each frequency resource, and is a positive integer; and $f_{hop}(i)$ and $f_m(i)$ are frequency resource adjustment values, and are 0 or positive integers.

With reference to the first aspect, in a second possible implementation manner of the first aspect, the determining, by the first user equipment according to the frequency resource numbers, a frequency resource occupied by the data signal includes: determining, by the first user equipment according to a formula $\tilde{n}_{PRB}(i)=\mathrm{mod}(\tilde{n}_{VRB}+f_{hop}(i)\cdot N_{RB}^{sb}, N_{RB}^{sb}\cdot N_{sb})$, a frequency resource number $\tilde{n}_{PRB}(i)$ occupied by the data signal, where: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{sb}^{RB}$ is a quantity of physical resources included in each frequency resource, and is a positive integer; and $f_{hop}(i)$ is a frequency resource adjustment value, and is 0 or a positive integer.

With reference to the first or the second possible implementation manner of the first aspect, in a third possible implementation manner, when $N_{sb}=1$, $f_{hop}(i)=0$, when $N_{sb}=2$, $$f_{hop}(i) = \mathrm{mod}\left(f_{hop}(i-1) + \sum_{k=i\cdot 10+1}^{i\cdot 10+9} c(k)\times 2^{k-(i\cdot 10+1)}, N_{sb}\right),$$

and when $N_{sb}>2$, $$f_{hop}(i) = \mathrm{mod}\left(f_{hop}(i-1) + \mathrm{mod}\left(\sum_{k=i\cdot 10+1}^{i\cdot 10+9} c(k)\times 2^{k-(i\cdot 10+1)}, N_{sb}-M\right)+M, N_{sb}\right),$$

where M is 0 or a positive integer not greater than $N_{sb}-2$ c(k) is a pseudo random sequence, and $f_{hop}(-1)=0$.

With reference to the first or the second possible implementation manner of the first aspect, in a fourth possible implementation manner, an initialization sequence of the pseudo random sequence c(k) is $c_{init}=N_{ID}^{cell}$, or $c_{init}=510$, or $c_{init}=2^9\cdot\mathrm{mod}(n_f,4)+N_{ID}^{cell}$, or $c_{init}=2^9\cdot\mathrm{mod}(n_f,4)+510$, where $N_{ID}^{cell}$ is an identifier of a physical layer cell, and $n_f$ is a system frame number.

With reference to the first or the second possible implementation manner of the first aspect, in a fifth possible implementation manner, the i is a timeslot sequence number, a subframe sequence number, or transmission times of the data signal.

With reference to the first or the second possible implementation manner of the first aspect, in a sixth possible implementation manner, the method further includes: obtaining, by the first user equipment, grouping information of a time resource, where the grouping information of the time resource includes time resource group sequence numbers of N time resource groups, and N is a positive integer; and the i is the time resource group sequence numbers.

With reference to the first or the second possible implementation manner of the first aspect, in a seventh possible implementation manner, the $N_{sb}$ is total transmission times of the data signal.

With reference to any one of the first aspect or the first to the seventh possible implementation manners of the first aspect, in an eighth possible implementation manner, indicating, by the indication signal, the frequency resource numbers of one or more physical resources includes: including, by the indication signal, a resource pattern of transmission field, where the resource pattern of transmission field is used to indicate the frequency resource numbers of one or more physical resources.

With reference to the sixth possible implementation manner of the first aspect, in a ninth possible implementation manner of the first aspect, the obtaining, by the first user equipment, grouping information of a time resource includes: obtaining, by the first user equipment, the grouping information of the time resource according to a correspondence between the time resource number and the time resource, where the correspondence between the time resource number and the time resource is preset, fed back by a receive end, or provided by a third party, for example, a base station.

With reference to any one of the first aspect or the first to the ninth possible implementation manners of the first aspect, in a twelfth possible implementation manner of the first aspect, the grouping information of the time resource includes:

the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, . . . , k−1, frequency resource numbers are 0, 1, . . . , t−1, physical resource numbers are 0, 1, . . . , k×t−1, and time resource group sequence numbers are 0, 1, . . . , 4.

According to a second aspect, a data transmission method is provided, including: receiving, by second user equipment, an indication signal, for example, a scheduling assignment (English full name: Scheduling Assignment, SA for short) signal, where the indication signal indicates frequency resource numbers of one or more physical resources; determining, by the second user equipment according to the frequency resource numbers, a frequency resource (that is, a frequency resource number) occupied by a data signal; and obtaining, by the second user equipment, the data signal according to the frequency resource.

With reference to the second aspect, in a first possible implementation manner of the second aspect, the determining, by the second user equipment according to the frequency resource numbers, a frequency resource occupied by the data signal includes: determining, by the second user equipment according to a formula $\tilde{n}_{PRB}(i) = \text{mod}(\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i), N_{RB}^{sb} \cdot N_{sb})$, a frequency resource number $\tilde{n}_{PRB}(i)$ occupied by the data signal, where: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources included in each frequency resource, and is a positive integer; and $f_{hop}(i)$ and $f_m(i)$ are frequency resource adjustment values, and are 0 or positive integers.

With reference to the second aspect, in a second possible implementation manner of the second aspect, the determining, by the second user equipment according to the frequency resource numbers, a frequency resource occupied by the data signal includes: determining, by the second user equipment according to a formula $\tilde{n}_{PRB}(i) = \text{mod}(\tilde{n}_{VRB} + f_{hop}(i) \cdot N_{RB}^{sb}, N_{RB}^{sb} \cdot N_{sb})$, a frequency resource number $\tilde{n}_{PRB}(i)$ occupied by the data signal, where: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources included in each frequency resource, and is a positive integer; and $f_{hop}(i)$ is a frequency resource adjustment value, and is 0 or a positive integer.

With reference to the first or the second possible implementation manner of the second aspect, in a third possible implementation manner, when $N_{sb}=1$, $f_{hop}(i)=0$, when $N_{sb}=2$, $$f_{hop}(i) = \text{mod}\left(f_{hop}(i-1) + \sum_{k=i\cdot10+1}^{i\cdot10+9} c(k) \times 2^{k-(i\cdot10+1)}, N_{sb}\right),$$

and when $N_{sb}>2$, $$f_{hop}(i) = \text{mod}\left(f_{hop}(i-1) + \text{mod}\left(\sum_{k=i\cdot10+1}^{i\cdot10+9} c(k) \times 2^{k-(i\cdot10+1)}, N_{sb} - M\right) + M, N_{sb}\right),$$

where M is 0 or a positive integer not greater than $N_{sb}-2$, c(k) is a pseudo random sequence, and $f_{hop}(-1)=0$.

With reference to the first or the second possible implementation manner of the second aspect, in a fourth possible implementation manner, an initialization sequence of the pseudo random sequence is c(k) is $c_{init}=N_{ID}^{cell}$, or $c_{init}=510$, or $c_{init}=2^9 \cdot \text{mod}(n_f,4)+N_{ID}^{cell}$, or $c_{init}=2^9 \cdot \text{mod}(n_f,4)+510$, where $N_{ID}^{cell}$ is an identifier of a physical layer cell, and $n_f$ is a system frame number.

With reference to the first or the second possible implementation manner of the second aspect, in a fifth possible implementation manner, the i is a timeslot sequence number, a subframe sequence number, or transmission times of the data signal.

With reference to the first or the second possible implementation manner of the second aspect, in a sixth possible implementation manner, the method further includes: obtaining, by the second user equipment, grouping information of a time resource, where the grouping information of the time resource includes time resource group sequence numbers of N time resource groups, and N is a positive integer; and the i is the time resource group sequence numbers.

With reference to the first or the second possible implementation manner of the second aspect, in a seventh possible implementation manner, the $N_{sb}$ is total transmission times of the data signal.

With reference to any one of the second aspect or the first to the seventh possible implementation manners of the second aspect, in an eighth possible implementation manner, indicating, by the indication signal, the frequency resource numbers of one or more physical resources includes: including, by the indication signal, a resource pattern of transmission field, where the resource pattern of transmission field is used to indicate the frequency resource numbers of one or more physical resources.

With reference to the sixth possible implementation manner of the second aspect, in a ninth possible implementation manner of the second aspect, the obtaining, by the second user equipment, grouping information of a time resource includes: obtaining, by the second user equipment, the grouping information of the time resource according to a correspondence between the time resource number and the time resource, where the correspondence between the time resource number and the time resource is preset, fed back by a receive end, or provided by a third party, for example, a base station.

With reference to any one of the second aspect or the first to the ninth possible implementation manners of the second aspect, in a twelfth possible implementation manner of the second aspect, the grouping information of the time resource includes:

the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, ..., k−1, frequency resource numbers are 0, 1, ..., t−1, physical resource numbers are 0, 1, ..., k×t−1, and time resource group sequence numbers are 0, 1, ..., 4.

With reference to the second aspect, in a thirteenth possible implementation manner, obtaining, by the second user equipment, the data signal according to the frequency resource includes: determining, by the second user equipment according to a correspondence between the frequency resource number occupied by the data signal and the frequency resource, a frequency resource corresponding to the frequency resource number; and obtaining the data signal from the frequency resource occupied by the data signal, where the correspondence between the frequency resource number occupied by the data signal and the frequency resource is preset, or obtained from a transmit end, or obtained from a third party, for example, a base station.

With reference to the second aspect, in a fourteenth possible implementation manner of the second aspect, the method further includes: receiving, by the second user equipment, a correspondence between the frequency resource number and the frequency resource.

According to a third aspect, user equipment is provided, including: a first sending unit, configured to send an indication signal, for example, a scheduling assignment (English full name: Scheduling Assignment, SA for short) signal, where the indication signal indicates frequency resource numbers of one or more physical resources; a determining unit, configured to determine, according to the frequency resource numbers, a frequency resource (that is, a frequency resource number) occupied by a data signal; and a second sending unit, configured to send the data signal by using the frequency resource.

With reference to the third aspect, in a first possible implementation manner, the determining unit is specifically configured to determine, according to a formula $\tilde{n}_{PRB}(i)= \mod(\tilde{n}_{VRB}+f_{hop}(i)\cdot N_{RB}^{sb}+((N_{RB}^{sb}-1)-2(\tilde{n}_{VRB} \mod N_{RB}^{sb}))\cdot f_m(i), N_{RB}^{sb}\cdot N_{sb})$, a frequency resource number $\tilde{n}_{PRB}(i)$ occupied by the data signal, where: mod ( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources included in each frequency resource, and is a positive integer; and $f_{hop}(i)$ and $f_m(i)$ are frequency resource adjustment values, and are 0 or positive integers.

With reference to the third aspect, in a second possible implementation manner, the determining unit is specifically configured to determine, according to a formula $\tilde{n}_{PRB}(i)= \mod(\tilde{n}_{VRB}+f_{hop}(i)\cdot N_{RB}^{sb}, N_{RB}^{sb}\cdot N_{sb})$, a frequency resource number $\tilde{n}_{PRB}(i)$ occupied by the data signal, where: mod ( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources included in each frequency resource, and is a positive integer; and $f_{hop}(i)$ is a frequency resource adjustment value, and is 0 or a positive integer.

With reference to the first or the second possible implementation manner of the third aspect, in a third possible implementation manner, when $N_{sb}=1$, $f_{hop}(i)=0$, when $N_{sb}=2$, $$f_{hop}(i) = \mod\left(f_{hop}(i-1) + \sum_{k=i\cdot 10+1}^{i\cdot 10+9} c(k)\times 2^{k-(i\cdot 10+1)}, N_{sb}\right),$$

and when $N_{sb}>2$ $$f_{hop}(i) = \mod\left(f_{hop}(i-1) + \mod\left(\sum_{k=i\cdot 10+1}^{i\cdot 10+9} c(k)\times 2^{k-(i\cdot 10+1)}, N_{sb}-M\right)+M, N_{sb}\right),$$

where M is 0 or a positive integer not greater than $N_{sb}-2$, c(k) is a pseudo random sequence, and $f_{hop}(-1)=0$.

With reference to the first or the second possible implementation manner of the third aspect, in a fourth possible implementation manner, an initialization sequence of the pseudo random sequence c(k) is $c_{init}=N_{ID}^{cell}$, or $c_{init}=510$, or $c_{init}=2^9\cdot\mod(n_f,4)+N_{ID}^{cell}$, or $c_{init}=2^9\cdot\mod(n_f,4)+510$, where $N_{ID}^{cell}$ is an identifier of a physical layer cell, and $n_f$ is a system frame number.

With reference to the first or the second possible implementation manner of the third aspect, in a fifth possible implementation manner, the i is a timeslot sequence number, a subframe sequence number, or transmission times of the data signal.

With reference to the first or the second possible implementation manner of the third aspect, in a sixth possible implementation manner, the user equipment further includes an obtaining unit, configured to obtain grouping information of a time resource, where the grouping information of the time resource includes time resource group sequence numbers of N time resource groups, and N is a positive integer; and the i is the time resource group sequence numbers.

With reference to the first or the second possible implementation manner of the third aspect, in a seventh possible implementation manner, the $N_{sb}$ is total transmission times of the data signal.

With reference to any one of the third aspect, or the first to the seventh possible implementation manners of the third aspect, in an eighth possible implementation manner, indicating, by the indication signal, the frequency resource numbers of one or more physical resources includes: including, by the indication signal, a resource pattern of transmission field, where the resource pattern of transmission field is used to indicate the frequency resource numbers of one or more physical resources.

With reference to the sixth possible implementation manner of the third aspect, in a ninth possible implementation manner of the third aspect, the obtaining, by the first user equipment, grouping information of a time resource includes: obtaining, by the first user equipment, the grouping information of the time resource according to a correspondence between the time resource number and the time resource, where the correspondence between the time resource number and the time resource is preset, fed back by a receive end, or provided by a third party, for example, a base station.

With reference to any one of the third aspect or the first to the ninth possible implementation manners of the third aspect, in a twelfth possible implementation manner of the third aspect, the grouping information of the time resource includes:

the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, . . . , k−1, frequency resource numbers are 0, 1, . . . , t−1, physical resource numbers are 0, 1, . . . , k×t−1, and time resource group sequence numbers are 0, 1, . . . , 4.

According to a fourth aspect, user equipment is provided, including: a receiving unit, configured to receive an indication signal, for example, a scheduling assignment (English full name: Scheduling Assignment, SA for short) signal, where the indication signal indicates frequency resource numbers of one or more physical resources; a determining unit, configured to determine, according to the frequency resource numbers, a frequency resource (that is, a frequency resource number) occupied by a data signal; and an obtaining unit, configured to obtain the data signal according to the frequency resource.

With reference to the fourth aspect, in a first possible implementation manner, the determining unit is specifically configured to determine, according to a formula $\tilde{n}_{PRB}(i)= \mod(\tilde{n}_{VRB}+f_{hop}(i)\cdot N_{RB}^{sb}+((N_{RB}^{sb}-1)-2(\tilde{n}_{VRB} \mod N_{RB}^{sb}))\cdot f_m(i), N_{RB}^{sb}\cdot N_{sb})$, a frequency resource number $\tilde{n}_{PRB}(i)$ occupied by the data signal, where: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources included in each frequency resource, and is a positive integer; and $f_{hop}(i)$ and $f_m(i)$ are frequency resource adjustment values, and are 0 or positive integers.

With reference to the fourth aspect, in a second possible implementation manner, the determining unit is specifically configured to determine, according to a formula $\tilde{n}_{PRB}(i)= \mod(\tilde{n}_{VRB}+f_{hop}(i)\cdot N_{RB}^{sb}, N_{RB}^{sb}\cdot N_{sb})$, a frequency resource number $\tilde{n}_{PRB}(i)$ occupied by the data signal, where: mod ( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources included in each frequency resource, and is a positive integer; and $f_{hop}(i)$ is a frequency resource adjustment value, and is 0 or a positive integer.

With reference to the first or the second possible implementation manner of the fourth aspect, in a third possible implementation manner, when $N_{sb}=1$, $f_{hop}(i)=0$, when $N_{sb}=2$, $$f_{hop}(i) = \mod\left(f_{hop}(i-1) + \sum_{k=i\cdot 10+1}^{i\cdot 10+9} c(k)\times 2^{k-(i\cdot 10+1)}, N_{sb}\right),$$

and when $N_{sb}>2$, $$f_{hop}(i) = \mod\left(f_{hop}(i-1) + \mod\left(\sum_{k=i\cdot 10+1}^{i\cdot 10+9} c(k)\times 2^{k-(i\cdot 10+1)}, N_{sb}-M\right)+M, N_{sb}\right),$$

where M is 0 or a positive integer not greater than $N_{sb}-2$, c(k) is a pseudo random sequence, and $f_{hop}(-1)=0$.

With reference to the first or the second possible implementation manner of the fourth aspect, in a fourth possible implementation manner, an initialization sequence of the pseudo random sequence c(k) is $c_{init}=N_{ID}^{cell}$, or $c_{init}=510$, or $c_{init}=2^9\cdot\mod(n_f,4)+N_{ID}^{cell}$, or $c_{init}=2^9\cdot\mod(n_f,4)+510$, where $N_{ID}^{cell}$ is an identifier of a physical layer cell, and $n_f$ is a system frame number.

With reference to the first or the second possible implementation manner of the fourth aspect, in a fifth possible implementation manner, the i is a timeslot sequence number, a subframe sequence number, or transmission times of the data signal.

With reference to the first or the second possible implementation manner of the fourth aspect, in a sixth possible implementation manner, the obtaining unit is specifically configured to obtain grouping information of a time resource, where the grouping information of the time resource includes time resource group sequence numbers of N time resource groups, and N is a positive integer; and the i is the time resource group sequence numbers.

With reference to the first or the second possible implementation manner of the fourth aspect, in a seventh possible implementation manner, the $N_{sb}$ is total transmission times of the data signal.

With reference to any one of the fourth aspect or the first to the seventh possible implementation manners of the fourth aspect, in an eighth possible implementation manner, indicating, by the indication signal, the frequency resource numbers of one or more physical resources includes: including, by the indication signal, a resource pattern of transmission field, where the resource pattern of transmission field is used to indicate the frequency resource numbers of one or more physical resources.

With reference to the sixth possible implementation manner of the fourth aspect, in a ninth possible implementation manner of the fourth aspect, the obtaining unit is specifically configured to obtain the grouping information of the time resource according to a correspondence between the time resource number and the time resource, where the correspondence between the time resource number and the time resource is preset, fed back by a receive end, or provided by a third party, for example, a base station.

With reference to any one of the fourth aspect or the first to the ninth possible implementation manners of the fourth aspect, in a twelfth possible implementation manner of the fourth aspect, the grouping information of the time resource includes:

the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, . . . , k−1, frequency resource numbers are 0, 1, . . . , t−1, physical resource numbers are 0, 1, . . . , k×t−1, and time resource group sequence numbers are 0, 1, . . . , 4.

With reference to the fourth aspect, in a thirteenth possible implementation manner, the determining unit is specifically configured to determine, according to a correspondence between the frequency resource number occupied by the data signal and the frequency resource, a frequency resource corresponding to the frequency resource number; and the obtaining unit is specifically configured to obtain the data signal from the frequency resource occupied by the data signal, where the correspondence between the frequency resource number occupied by the data signal and the frequency resource is preset, or obtained from a transmit end, or obtained from a third party, for example, a base station.

With reference to the fourth aspect, in a fourteenth possible implementation manner of the fourth aspect, the receiving unit is specifically configured to receive the correspondence between the frequency resource number and the frequency resource.

Based on the foregoing technical solutions, in the embodiments of the present invention, first user equipment may send an indication signal, where the indication signal indicates frequency resource numbers of one or more physical resources; the first user equipment determines, according to the frequency resource numbers, a frequency resource occupied by a data signal; and the first user equipment sends the data signal by using the frequency resource. Therefore, frequency selective fading is effectively avoided, and a frequency diversity gain can be obtained.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
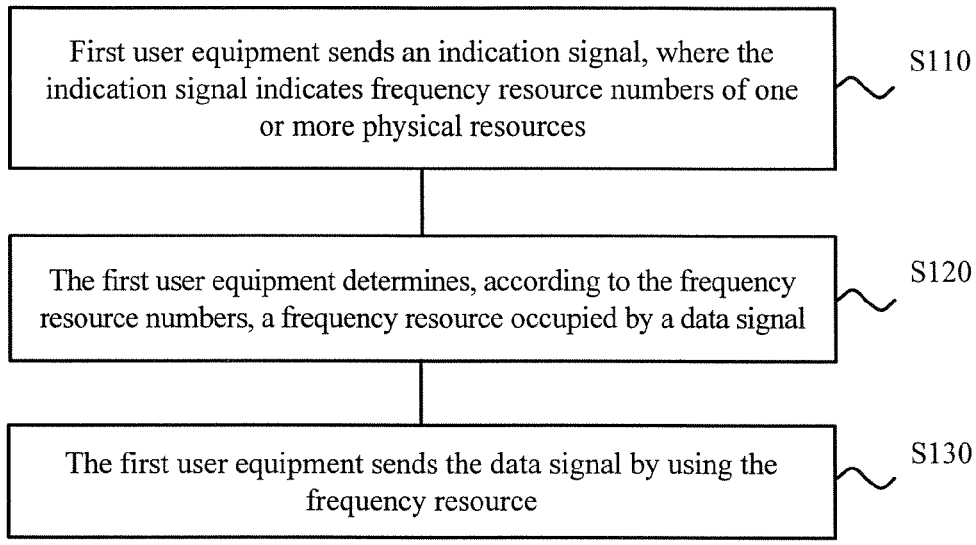
FIG. 1 is a schematic flowchart of a data transmission method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), Universal Mobile Telecommunications System (Universal Mobile Telecommunication System, UMTS), and a Worldwide Interoperability for Microwave Access (Worldwide Interoperability for Microwave Access, WiMAX) communications system.

It should be understood that in the embodiments of the present invention, user equipment (English full name: User Equipment, UE for short) includes but is not limited to a mobile station (English full name: Mobile Station, MS for short), a mobile terminal (Mobile Terminal), a mobile telephone (Mobile Telephone), a handset (handset), portable equipment (portable equipment), and the like. The user equipment may communicate with one or more core networks by using a radio access network (English full name: Radio Access Network, RAN for short). For example, the user equipment may be a mobile telephone (or referred to as a "cellular" phone), or a computer having a wireless communication function; the user equipment may further be a portable, pocket-sized, handheld, computer built-in, or in-vehicle mobile apparatus.

It should be understood that the user equipment in the technical solutions of the present invention has a D2D communication function, that is, two user equipments may perform D2D communication with each other.

It should further be understood that in the embodiments of the present invention, first user equipment and second user equipment are termed merely for ease of description, and are not intended to constitute any limitation.

In the embodiments of the present invention, a base station may be a base station (English full name: Base Transceiver Station, BTS for short) in GSM or CDMA, or may be a NodeB (NodeB) in WCDMA, or may be an evolved NodeB (English full name: evolved Node B, eNB or e-NodeB for short) in LTE, or may be a cluster head (Cluster Head) of a user cluster in D2D communication, which is not limited in the embodiments of the present invention.

FIG. 1 shows a data transmission method 100, and the method 100 may be executed by, for example, user equipment. As shown in FIG. 1, the method 100 includes the following steps.

S110. First user equipment sends an indication signal, for example, a scheduling assignment (English full name: Scheduling Assignment, SA for short) signal, where the indication signal indicates frequency resource numbers of one or more physical resources.

Specifically, the first user equipment may send the indication signal according to scheduling information of a base station, which is not limited in this embodiment of the present invention. For example, the first user equipment may send the indication signal according to feedback of a receive end, or may send the indication signal according to pre-configuration.

S120. The first user equipment determines, according to the frequency resource numbers, a frequency resource (that is, a frequency resource number) occupied by a data signal.

It should be understood that the first user equipment may determine, by using multiple methods, a frequency resource occupied by the data signal, that is, a frequency resource number occupied by the data signal. This is not limited in this embodiment of the present invention.

S130. The first user equipment sends the data signal by using the frequency resource (that is, a frequency resource corresponding to a frequency resource number).

It should be understood that the first user equipment may send, by using multiple methods, the data signal. This is not limited in this embodiment of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes in detail the data transmission method from a perspective of first user equipment according to an embodiment of the present invention with reference to FIG. 1.

The following describes this embodiment of the present invention in more detail with reference to a specific example. It should be noted that, the example in FIG. 1 is intended only to help persons skilled in the art understand the embodiments of the present invention, but is not intended to restrict the embodiments of the present invention to a specific numerical value or a specific scenario that is illustrated. Persons skilled in the art certainly can make various equivalent modifications or changes according to the given example in FIG. 1, which also fall within the scope of the embodiments of the present invention.

According to this embodiment of the present invention, indicating, by the indication signal, the frequency resource numbers of one or more physical resources includes: including, by the indication signal, a resource pattern of transmission (English full name: Resource Pattern of Transmission, RPT for short) field. The resource pattern of transmission field is used to indicate the frequency resource numbers of one or more physical resources.

Specifically, for example, two bits 00 of the RPT field indicate a frequency resource number 0. Two bits 01 of the RPT field indicate a frequency resource number 1. Two bits 10 of the RPT field indicate a frequency resource number 2. Two bits 11 of the RPT field indicate a frequency resource number 3. Other frequency resource numbers may further be represented by more bits of the RPT field, and this is not limited in this embodiment of the present invention.

Optionally, the determining, by the first user equipment according to the frequency resource numbers, the frequency resource occupied by the data signal includes: determining, by the first user equipment according to a formula $$\tilde{n}_{PRB}(i) = \text{mod}(\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i), N_{RB}^{sb} \cdot N_{sb}) \quad (1),$$

a frequency resource number $\tilde{n}_{PRB}$ occupied by the data signal, where: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, for example, subcarriers or carriers, and is a positive integer; $N_{RB}^{sb}$ is a quantity of physical resources included in each frequency resource, for example, subcarriers or carriers, and is a positive integer; and $f_{hop}(i)$ and $f_m(i)$ are frequency resource adjustment values, and are 0 or positive integers.

Optionally, the determining, by the first user equipment according to the frequency resource numbers, the frequency resource occupied by the data signal includes : determining, by the first user equipment according to a formula $$\tilde{n}_{PRB}(i) = \text{mod}(\tilde{n}_{VRB} + f_{hop}(i) \cdot N_{RB}^{sb}, N_{RB}^{sb} \cdot N_{sb}) \quad (2),$$

a frequency resource number $\tilde{n}_{PRB}(i)$ occupied by the data signal, where: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, for example, subcarriers or carriers, and is a positive integer; $N_{RB}^{sb}$ is a quantity of physical resources included in each frequency resource, for example, subcarriers or carriers, and is a positive integer; and $f_{hop}(i)$ is a frequency resource adjustment value, and is 0 or a positive integer.

It should be understood that the frequency resource adjustment value $f_{hop}(i)$ or $f_m(i)$ may be a random number or any value determined in another manner, which is not limited in this embodiment of the present invention.

Optionally, when $N_{sb}=1$, $f_{hop}(i)=0$; when $N_{sb}=2$, $$f_{hop}(i) = \text{mod}\left(f_{hop}(i-1) + \sum_{k=i\cdot 10+1}^{i\cdot 10+9} c(k) \times 2^{k-(i\cdot 10+1)}, N_{sb}\right); \quad (3)$$

and when $N_{sb}>2$, $$f_{hop}(i) = \text{mod}\left(f_{hop}(i-1) + \text{mod}\left(\sum_{k=i\cdot 10+1}^{i\cdot 10+9} c(k) \times 2^{k-(i\cdot 10+1)}, N_{sb} - M\right) + M, N_{sb}\right), \quad (4)$$

where M is 0 or a positive integer not greater than $N_{sb}-2$, c(k) is a pseudo random sequence, and $f_{hop}(-1)=0$.

It should be noted that the pseudo random sequence c(n) is a Gold sequence with a length of 31 and an output sequence with a length of $M_{PN}$, where $n=0,1,\ldots,M_{PN}-1$, and is defined by using the following formulas:

$$c(n) = \text{mod}(x_1(n+N_C) + x_2(n+N_C), 2)$$

$$x_1(n+31) = \text{mod}(x_1(n+3) + x_1(n), 2)$$

$$x_2(n+31) = \text{mod}(x_2(n+3) + x_2(n+1) + x_2(n), 2) \quad (5)$$

where $N_C=1600$ and the first sequence is initialized by using $x_1(0)=1$, $x_1(n)=0, =1, 2, \ldots, 30$, and the second sequence is initialized by using $c_{init}=\Sigma_{i=0}^{30} x_2(i) \cdot 2^i$.

Optionally, when $N_{sb}=1$, $f_m(i)=\mod(i, 2)$; and when $N_{sb}>1$, $f_m(i)=c(i \cdot 10)$.

In addition, in the foregoing embodiment, there is an interval of at least M frequency resources between any two frequency resources, which can therefore ensure that a frequency diversity gain is obtained.

Optionally, an initialization sequence of the pseudo random sequence $c(k)$ is $c_{init}=N_{ID}^{cell}$, or $c_{init}=510$, or $c_{init}=2^9 \cdot \mod(n_f, 4) + N_{ID}^{cell}$, or $c_{init}=2^9 \cdot \mod(n_f, 4) + 510$, where $N_{ID}^{cell}$ is an identifier of a physical layer cell, and $n_f$ is a system frame number.

Optionally, the i may be a timeslot sequence number, a subframe sequence number, or transmission times of the data signal.

Specifically, the i may be a timeslot sequence number in a data subframe (that is, 10 milliseconds), or may be a subframe sequence number in a time resource pool of any length, or may be a data frame number x 10+the subframe sequence number, or may be the transmission times of the data signal. For example, i=0 represents transmission for the first time, i=1 represents transmission for the second time, and so on.

Optionally, the method further includes: obtaining, by the first user equipment, grouping information of a time resource, where the grouping information of the time resource includes time resource group sequence numbers of N time resource groups, and N is a positive integer; and the i is the time resource group sequence numbers.

It should be understood that the grouping information of the time resource may be sent by a third party, for example, a base station, or by a receive end, or may be preset in the user equipment, which is not limited in this embodiment of the present invention.

It should be noted that the physical resource may be a resource element (English full name: Resource Element, RE for short) or a physical resource block (English full name: Physical Resource Block, PRB for short); the frequency resource may be a carrier or a subcarrier; and the time resource may be a subframe, a timeslot, or the like. In D2D communication, for example, in a VoIP (Voice over Internet Protocol) voice service, a data transmission pattern is to transmit, in 20 milliseconds (ms), that is, 20 subframes, information of 44 bytes (Bytes), 352 bits (bit) in total, including: payload (payload) information of 328 bits and cyclic redundancy check (English full name: Cyclic Redundancy Check, CRC for short) information of 24 bits. To ensure coverage of the VoIP voice service, a VoIP data packet needs to be transmitted for multiple times, for example, five times, in a period of 20 ms. That is, multiple subframes in the 20 subframes need to be occupied to send the VoIP data packet.

Referring to Table 1, in this step, a time resource, for example, 20 subframes, used to transmit the data signal may be classified into five groups. Each time resource group includes four subframes, each subframe includes five frequency resources, and there are 20 physical resources in total. Therefore, in each time resource group, time resource numbers are 0, 1, . . . , 3, frequency resource numbers are 0, 1, . . . , 4, physical resource numbers are 0, 1, . . . , 19, and time resource group sequence numbers are 0, 1, . . . , 4. That is, in the 20 subframes, the VoIP data packet is sent by using any subframe in each time resource group, five subframes in total, so as to ensure the coverage of the VoIP voice service.

Specifically, the i may be the time resource group sequence numbers 0, 1, . . . , 4. For example, if transmission occurs in a zeroth group, the i=0 is used, and if transmission occurs in a first group, the i=1 is used.

Optionally, the $N_{sb}$ is total transmission times of the data signal.

Specifically, referring to Table 1, the data signal is transmitted for five times in total, and therefore $N_{sb}=5$.

Optionally, the obtaining, by the first user equipment, grouping information of a time resource includes: obtaining, by the first user equipment, the grouping information of the time resource according to a correspondence between the time resource number and the time resource, where the correspondence between the time resource number and the time resource is preset, fed back by a receive end, or provided by a third party, for example, a base station.

Optionally, the grouping information of the time resource includes: the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, . . . , k−1, frequency resource numbers are 0, 1, . . . , t−1, physical resource numbers are 0, 1, . . . , k×t−1, and time resource group sequence numbers are 0, 1, . . . , 4.

Therefore, in this embodiment of the present invention, frequency selective fading can be effectively avoided, and a frequency diversity gain can be obtained.

Figure 2:
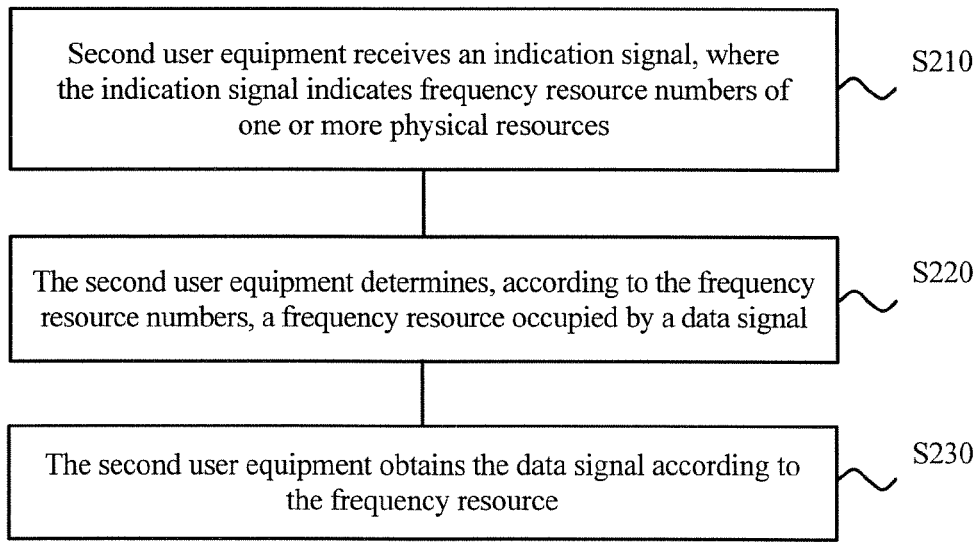
FIG. 2 is a schematic flowchart of a data transmission method according to another embodiment of the present invention.

The foregoing describes in detail the data transmission method from a perspective of user equipment serving as a transmit end according to this embodiment of the present invention with reference to FIG. 1. The following describes a data transmission method from a perspective of user equipment serving as a receive end according to an embodiment of the present invention with reference to FIG. 2. FIG. 2 provides description from a perspective of user equipment

TABLE 1

| | | Time resource (for example, 20 subframes) Time resource group sequence number | | | | | | | | | | | | | | | | | | | |
|---|---|---|---|---|---|---|---|---|---|---|---|---|---|---|---|---|---|---|---|---|---|
| | | 0 | | | | 1 | | | | 2 | | | | 3 | | | | 4 | | | |
| | | | | | | | | | | Time resource number | | | | | | | | | | | |
| | | 0 | 1 | 2 | 3 | 0 | 1 | 2 | 3 | 0 | 1 | 2 | 3 | 0 | 1 | 2 | 3 | 0 | 1 | 2 | 3 |
| Frequency resource number | 0 | 0 | 1 | 2 | 3 | 0 | 1 | 2 | 3 | 0 | 1 | 2 | 3 | 0 | 1 | 2 | 3 | 0 | 1 | 2 | 3 |
| | 1 | 4 | 5 | 6 | 7 | 4 | 5 | 6 | 7 | 4 | 5 | 6 | 7 | 4 | 5 | 6 | 7 | 4 | 5 | 6 | 7 |
| | 2 | 8 | 9 | 10 | 11 | 8 | 9 | 10 | 11 | 8 | 9 | 10 | 11 | 8 | 9 | 10 | 11 | 8 | 9 | 10 | 11 |
| | 3 | 12 | 13 | 14 | 15 | 12 | 13 | 14 | 15 | 12 | 13 | 14 | 15 | 12 | 13 | 14 | 15 | 12 | 13 | 14 | 15 |
| | 4 | 16 | 17 | 18 | 19 | 16 | 17 | 18 | 19 | 16 | 17 | 18 | 19 | 16 | 17 | 18 | 19 | 16 | 17 | 18 | 19 | serving as a receive end. It should be noted that the user equipment may be both a transmit end and a receive end.

FIG. 2 shows another data transmission method 200 according to an embodiment of the present invention, where the method 200 includes the following steps.

S210. Second user equipment receives an indication signal, for example, a scheduling assignment (English full name: Scheduling Assignment, SA for short) signal, where the indication signal indicates frequency resource numbers of one or more physical resources.

Specifically, the second user equipment may receive the indication signal according to scheduling information of a base station, which is not limited in this embodiment of the present invention. For example, the second user equipment may receive the indication signal according to an indication of a transmit end, or receive the indication signal according to pre-configuration.

S220. The second user equipment determines, according to the frequency resource numbers, a frequency resource (that is, a frequency resource number) occupied by a data signal.

It should be understood that the second user equipment may obtain, by using multiple methods, the frequency resource, that is, a frequency resource number, occupied by the data signal, and the data signal may occupy one or more frequency resource numbers, which is not limited in this embodiment of the present invention.

S230. The second user equipment obtains the data signal according to the frequency resource.

It should be understood that the second user equipment may obtain, by using multiple methods, the data signal. This is not limited in this embodiment of the present invention.

The foregoing describes in detail the data transmission method from a perspective of second user equipment according to an embodiment of the present invention with reference to FIG. 2.

The following describes this embodiment of the present invention in more detail with reference to a specific example. It should be noted that, the example in FIG. 2 is intended only to help persons skilled in the art understand the embodiments of the present invention, but is not intended to restrict the embodiments of the present invention to a specific numerical value or a specific scenario that is illustrated. Persons skilled in the art certainly can make various equivalent modifications or changes according to the given example in FIG. 2, which also fall within the scope of the embodiments of the present invention.

According to this embodiment of the present invention, indicating, by the indication signal, the frequency resource numbers of one or more physical resources includes: including, by the indication signal, a resource pattern of transmission (English full name: Resource Pattern of Transmission, RPT for short) field, where the resource pattern of transmission field is used to indicate the frequency resource numbers of one or more physical resources.

Specifically, for example, two bits 00 of the RPT field indicate a frequency resource number 0; two bits 01 of the RPT field indicate a frequency resource number 1; two bits 10 of the RPT field indicate a frequency resource number 2; and two bits 11 of the RPT field indicate a frequency resource number 3. Other frequency resource numbers may further be represented by more bits of the RPT field, which is not limited in this embodiment of the present invention.

Optionally, the determining, by the second user equipment according to the frequency resource numbers, the frequency resource occupied by the data signal includes: determining, by the second user equipment according to the formula (1), a frequency resource number $\tilde{n}_{PRB}(i)$ occupied by the data signal.

Optionally, the determining, by the second user equipment according to the frequency resource numbers, the frequency resource occupied by the data signal includes: determining, by the second user equipment according to the formula (2), a frequency resource number $\tilde{n}_{PRB}(i)$ occupied by the data signal.

It should be understood that the frequency resource adjustment value $f_{hop}(i)$ or $f_m(i)$ may be a random number or any value determined in another manner, which is not limited in this embodiment of the present invention.

Optionally, when $N_{sb}=1$, $f_{hop}(i)=0$; when $N_{sb}=2$, the $f_{hop}(i)$ is determined according to the formula (3); and when $N_{sb}>2$, the $f_{hop}(i)$ is determined according to the formula (4).

Optionally, when $N_{sb}=1$, $f_m(i)=\mod(i,2)$; and when $N_{sb}>1$, $f_m(i)=c(i\cdot 10)$.

In addition, in the foregoing embodiment, there is an interval of at least M frequency resources between any two frequency resources, which can therefore ensure that a frequency diversity gain is obtained.

Optionally, an initialization sequence of the pseudo random sequence c(k) is $c_{init}=N_{ID}^{cell}$, or $c_{init}=510$, or $c_{init}=2^9\cdot\mod(n_f,4)+N_{ID}^{cell}$, or $c_{init}=2^9\cdot\mod(n_f,4)+510$, where $N_{ID}^{cell}$ is an identifier of a physical layer cell, and $n_f$ is a system frame number.

Optionally, the i may be a timeslot sequence number, a subframe sequence number, or transmission times of the data signal.

Specifically, the i may be a timeslot sequence number in a data subframe (that is, 10 milliseconds), or may be a subframe sequence number in a time resource pool of any length, or may be a data frame number x 10+the subframe sequence number, or may be the transmission times of the data signal. For example, i=0 represents transmission for the first time, i=1 represents transmission for the second time, and so on.

Optionally, the method further includes: obtaining, by the second user equipment, grouping information of a time resource, where the grouping information of the time resource includes time resource group sequence numbers of N time resource groups, and N is a positive integer; and the i is the time resource group sequence numbers.

It should be understood that the grouping information of the time resource may be sent by a third party, for example, a base station, or by a transmit end, or may be preset in the user equipment, which is not limited in this embodiment of the present invention.

It should be noted that the physical resource may be a resource element (English full name: Resource Element, RE for short) or a physical resource block (English full name: Physical Resource Block, PRB for short) ; the frequency resource may be a carrier or a subcarrier; and the time resource may be a subframe, a timeslot, or the like. In D2D communication, for example, in a VoIP (Voice over Internet Protocol) voice service, a data transmission pattern is to transmit, in 20 milliseconds (ms), that is, 20 subframes, information of 44 bytes (Bytes), 352 bits (bit) in total, including: payload (payload) information of 328 bits and cyclic redundancy check (English full name: Cyclic Redundancy Check, CRC for short) information of 24 bits. To ensure coverage of the VoIP voice service, a VoIP data packet needs to be transmitted for multiple times, for example, five times, in a period of 20 ms. That is, multiple subframes in the 20 subframes need to be occupied to send the VoIP data packet.

Referring to Table 1, in this step, a time resource, for example, 20 subframes, used to transmit the data signal may be classified into five groups. Each time resource group includes four subframes, each subframe includes five frequency resources, and there are 20 physical resources in total. Therefore, in each time resource group, time resource numbers are 0, 1, ..., 3, frequency resource numbers are 0, 1, ..., 4, physical resource numbers are 0, 1, ..., 19, and time resource group sequence numbers are 0, 1, ..., 4. That is, in the 20 subframes, the VoIP data packet is sent by using any subframe in each time resource group, five subframes in total, so as to ensure the coverage of the VoIP voice service.

Specifically, the i may be the time resource group sequence numbers 0, 1, ..., 4. For example, if transmission occurs in a zeroth group, the i=0 is used, and if transmission occurs in a first group, the i=1 is used.

Optionally, the $N_{sb}$ is total transmission times of the data signal.

Specifically, referring to Table 1, the data signal is transmitted for five times in total, and therefore $N_{sb}$=5.

Optionally, the obtaining, by the second user equipment, grouping information of a time resource includes: obtaining, by the second user equipment, the grouping information of the time resource according to a correspondence between the time resource number and the time resource, where the correspondence between the time resource number and the time resource is preset, fed back by a receive end, or provided by a third party, for example, a base station.

Optionally, the grouping information of the time resource includes: the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, ..., k−1, frequency resource numbers are 0, 1, ..., t−1, physical resource numbers are 0, 1, ..., k×t−1, and time resource group sequence numbers are 0, 1, ..., 4.

According to this embodiment of the present invention, obtaining, by the second user equipment, the data signal from the frequency resource occupied by the data signal includes: determining, by the second user equipment according to a correspondence between the frequency resource number occupied by the data signal and the frequency resource, a frequency resource corresponding to the frequency resource number; and obtaining the data signal from the frequency resource occupied by the data signal, where the correspondence between the frequency resource number occupied by the data signal and the frequency resource is preset, or obtained from a transmit end, or obtained from a third party, for example, a base station.

Optionally, the method further includes: receiving, by the second user equipment, the correspondence between the frequency resource number and the frequency resource.

Therefore, in this embodiment of the present invention, frequency selective fading can be effectively avoided, and a frequency diversity gain can be obtained.

The foregoing describes in detail the data transmission method according to this embodiment of the present invention with reference to FIG. 1 and FIG. 2. The following describes user equipment in detail according to an embodiment of the present invention with reference to FIG. 3 to FIG. 6.

Figure 3:
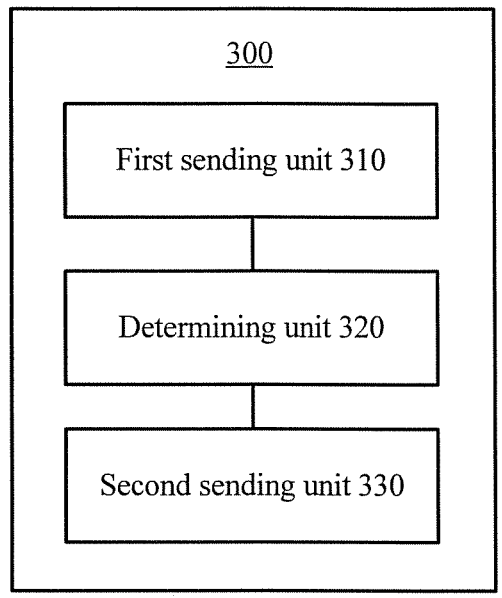
FIG. 3 is a schematic block diagram of user equipment according to an embodiment of the present invention.

FIG. 3 shows a schematic block diagram of user equipment 300 according to an embodiment of the present invention. As shown in FIG. 3, the user equipment 300 includes: a first sending unit 310, a determining unit 320, and a second sending unit 330.

The first sending unit 310 is configured to send an indication signal, for example, a scheduling assignment (English full name: Scheduling Assignment, SA for short) signal, where the indication signal indicates frequency resource numbers of one or more physical resources.

Specifically, the first sending unit 310 may send the indication signal according to scheduling information of a base station, which is not limited in this embodiment of the present invention. For example, the first sending unit 320 may send the indication signal according to feedback of a receive end, or may send the indication signal according to pre-configuration.

The determining unit 320 is configured to determine, according to the frequency resource numbers, a frequency resource (that is, a frequency resource number) occupied by a data signal.

The second sending unit 330 is configured to send the data signal by using the frequency resource (that is, a frequency resource corresponding to the frequency resource number).

The foregoing describes in detail the user equipment 300 according to this embodiment of the present invention with reference to FIG. 3.

The following describes this embodiment of the present invention in more detail with reference to a specific example. It should be noted that, the example in FIG. 3 is intended only to help persons skilled in the art understand the embodiments of the present invention, but is not intended to restrict the embodiments of the present invention to a specific numerical value or a specific scenario that is illustrated. Persons skilled in the art certainly can make various equivalent modifications or changes according to the given example in FIG. 3, which also fall within the scope of the embodiments of the present invention.

According to this embodiment of the present invention, indicating, by the indication signal, the frequency resource numbers of one or more physical resources includes: including, by the indication signal, a resource pattern of transmission (English full name: Resource Pattern of Transmission, RPT for short) field, where the resource pattern of transmission field is used to indicate the frequency resource numbers of one or more physical resources.

Specifically, for example, two bits 00 of the RPT field indicate a frequency resource number 0; two bits 01 of the RPT field indicate a frequency resource number 1; two bits 10 of the RPT field indicate a frequency resource number 2; and two bits 11 of the RPT field indicate a frequency resource number 3. Other frequency resource numbers may further be represented by more bits of the RPT field, which is not limited in this embodiment of the present invention.

Optionally, the determining unit 320 is specifically configured to determine, according to the formula (1), a frequency resource number $ñ_{PRB}(i)$ occupied by the data signal.

Optionally, the determining unit 320 is specifically configured to determine, according to the formula (2), a frequency resource number $ñ_{PRB}(i)$ occupied by the data signal.

It should be understood that the frequency resource adjustment value $f_{hop}(i)$ or $f_m(i)$ may be a random number or any value determined in another manner, which is not limited in this embodiment of the present invention.

Optionally, when $N_{sb}$=1, $f_{hop}(i)$=0; when $N_{sb}$=2, the $f_{hop}(i)$ is determined according to the formula (3); and when $N_{sb}$>2, the $f_{hop}(i)$ is determined according to the folmula (4).

Optionally, when $N_{sb}$=1, $f_m(i)$=mod(i, 2); and when $N_{sb}$>1, $f_m(i)$=c(i·10).

In addition, in the foregoing embodiment, there is an interval of at least M frequency resources between any two frequency resources, which can therefore ensure that a frequency diversity gain is obtained.

Optionally, an initialization sequence of the pseudo random sequence c(k) is $c_{init}=N_{ID}^{cell}$, or $c_{init}=510$, or $c_{init}=2^9 \cdot mod(n_f,4)+N_{ID}^{cell}$, or $c_{init}=2^9 \cdot mod(n_f,4)+510$, where $N_{ID}^{cell}$ is an identifier of a physical layer cell, and $n_f$ is a system frame number.

Optionally, the i may be a timeslot sequence number, a subframe sequence number, or transmission times of the data signal.

Specifically, the i may be a timeslot sequence number in a data subframe (that is, 10 milliseconds), or may be a subframe sequence number in a time resource pool of any length, or may be a data frame number x 10+the subframe sequence number, or may be the transmission times of the data signal. For example, i=0 represents transmission for the first time, i=1 represents transmission for the second time, and so on.

Optionally, the user equipment further includes: an obtaining unit 340, configured to obtain grouping information of a time resource, where the grouping information of the time resource includes time resource group sequence numbers of N time resource groups, and N is a positive integer; and the i is the time resource group sequence numbers.

Specifically, the obtaining unit 340 may obtain the grouping information of the time resource shown in Table 1, and the time resource numbers of physical resources in each time resource group, where the grouping information of the time resource may be sent by a third party, for example, a base station, or by a receive end, or may be preset in the user equipment, which is not limited in this embodiment of the present invention.

It should be noted that the physical resource may be a resource element (English full name: Resource Element, RE for short) or a physical resource block (English full name: Physical Resource Block, PRB for short) ; the frequency resource may be a carrier or a subcarrier; and the time resource may be a subframe, a timeslot, or the like. In D2D communication, for example, in a VoIP (Voice over Internet Protocol) voice service, a data transmission pattern is to transmit, in 20 milliseconds (ms), that is, 20 subframes, information of 44 bytes (Bytes), 352 bits (bit) in total, including: payload (payload) information of 328 bits and cyclic redundancy check (English full name: Cyclic Redundancy Check, CRC for short) infatuation of 24 bits. To ensure coverage of the VoIP voice service, a VoIP data packet needs to be transmitted for multiple times, for example, five times, in a period of 20 ms. That is, multiple subframes in the 20 subframes need to be occupied to send the VoIP data packet.

Referring to Table 1, in this step, a time resource, for example, 20 subframes, used to transmit the data signal may be classified into five groups. Each time resource group includes four subframes, each subframe includes five frequency resources, and there are 20 physical resources in total. Therefore, in each time resource group, time resource numbers are 0, 1, . . . , 3, frequency resource numbers are 0, 1, . . . , 4, physical resource numbers are 0, 1, . . . , 19, and time resource group sequence numbers are 0, 1, . . . , 4. That is, in the 20 subframes, the VoIP data packet is sent by using any subframe in each time resource group, five subframes in total, so as to ensure the coverage of the VoIP voice service.

Specifically, the i may be the time resource group sequence numbers 0, 1, . . . 4. For example, if transmission occurs in a zeroth group, the i=0 is used, and if transmission occurs in a first group, the i=1 is used.

Optionally, the $N_{sb}$ may be total transmission times of the data signal.

Specifically, referring to Table 1, the data signal is transmitted for five times in total, and therefore $N_{sb}=5$.

Optionally, the obtaining unit 340 is specifically configured to obtain the grouping information of the time resource according to a correspondence between the time resource number and the time resource, where the correspondence between the time resource number and the time resource is preset, fed back by the receive end, or provided by a third party, for example, a base station.

Optionally, the grouping information of the time resource includes: the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0,1, . . . , k−1, frequency resource numbers are 0, 1, . . . , t−1, physical resource numbers are 0, 1, . . . , k×t−1, and time resource group sequence numbers are 0, 1, . . . , 4.

Therefore, in this embodiment of the present invention, frequency selective fading can be effectively avoided, and a frequency diversity gain can be obtained.

Figure 4:
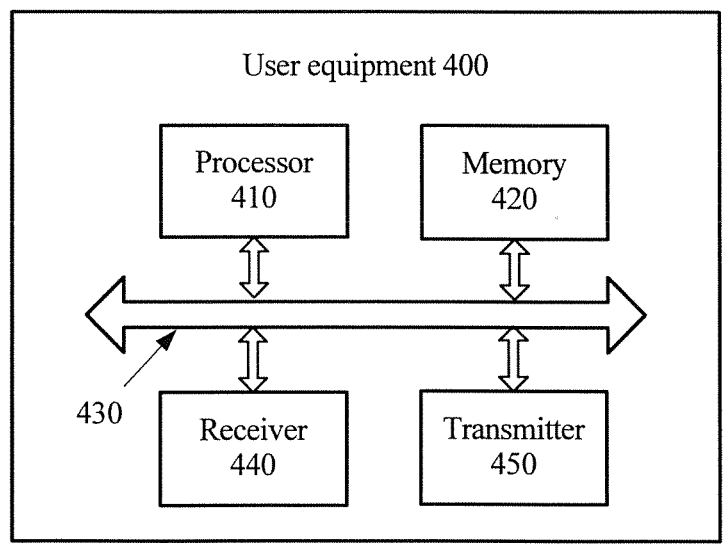
FIG. 4 is a schematic block diagram of user equipment according to another embodiment of the present invention.

From a perspective of another implementation manner, as shown in FIG. 4, an embodiment of the present invention further provides user equipment 400, where the user equipment 400 includes a processor 410, a memory 420, a bus system 430, a receiver 440, and a transmitter 450. The processor 410, the memory 420, the receiver 440, and the transmitter 450 are connected to each other by using the bus system 430. The memory 420 is configured to store an instruction, and the processor 410 is configured to execute the instruction stored in the memory 420, so as to control the receiver 440 to receive a signal, or an instruction, or a message, and control the transmitter 450 to send a signal, or signaling, or a message, and the like. The processor 410 is configured to determine, according to frequency resource numbers that are of one or more physical resources and that are sent by the transmitter 450, a frequency resource (that is, a frequency resource number) occupied by a data signal; and the transmitter 450 is configured to send an indication signal, for example, a scheduling assignment (English full name: Scheduling Assignment, SA for short) signal, where the indication signal indicates the frequency resource numbers of one or more physical resources, and send the data signal by using the frequency resource (that is, a frequency resource corresponding to the frequency resource number) occupied by the data signal.

The foregoing describes in detail the user equipment 400 according to this embodiment of the present invention with reference to FIG. 4.

The following describes this embodiment of the present invention in more detail with reference to a specific example. It should be noted that, the example in FIG. 4 is intended only to help persons skilled in the art understand the embodiments of the present invention, but is not intended to restrict the embodiments of the present invention to a specific numerical value or a specific scenario that is illustrated. Persons skilled in the art certainly can make various equivalent modifications or changes according to the given example in FIG. 4, which also fall within the scope of the embodiments of the present invention.

According to this embodiment of the present invention, indicating, by the indication signal, the frequency resource numbers of one or more physical resources includes: including, by the indication signal, a resource pattern of transmission (English full name: Resource Pattern of Transmission, RPT for short) field, where the resource pattern of transmission field is used to indicate the frequency resource numbers of one or more physical resources.

Specifically, for example, two bits 00 of the RPT field indicate a frequency resource number 0; two bits 01 of the RPT field indicate a frequency resource number 1; two bits 10 of the RPT field indicate a frequency resource number 2; and two bits 11 of the RPT field indicate a frequency resource number 3. Other frequency resource numbers may further be represented by more bits of the RPT field, which is not limited in this embodiment of the present invention.

Optionally, the processor 410 determines, according to the formula (1), a frequency resource number $\tilde{n}_{PRB}(i)$ occupied by the data signal.

Optionally, the processor 410 determines, according to the formula (2), a frequency resource number $\tilde{n}_{PRB}(i)$ occupied by the data signal.

It should be understood that the frequency resource adjustment value $f_{hop}(i)$ or $f_m(i)$ may be a random number or any value determined in another manner, which is not limited in this embodiment of the present invention.

Optionally, when $N_{sb}=1$; $f_{hop}(i)=0$; when $N_{sb}=2$, the $f_{hop}(i)$ is determined according to the formula (3); and when $N_{sb}>2$, the $f_{hop}(i)$ is determined according to the formula (4).

Optionally, when $N_{sb}=1$, $f_m(i)=\mod(i,2)$; and when $N_{sb}>1$, $f_m(i)=c(i\cdot 10)$.

In addition, in the foregoing embodiment, there is an interval of at least M frequency resources between any two frequency resources, which can therefore ensure that a frequency diversity gain is obtained.

Optionally, an initialization sequence of the pseudo random sequence $c(k)$ is $c_{init}=N_{ID}^{cell}$, or $c_{init}=510$, or $c_{init}=2^9 \cdot \mod(n_f, 4)+N_{ID}^{cell}$, or $c_{init}=2^9 \cdot \mod(n_f, 4)+510$, where $N_{ID}^{cell}$ is an identifier of a physical layer cell, and $n_f$ is a system frame number.

Optionally, the i may be a timeslot sequence number, a subframe sequence number, or transmission times of the data signal.

Specifically, the i may be a timeslot sequence number in a data subframe (that is, 10 milliseconds), or may be a subframe sequence number in a time resource pool of any length, or may be a data frame number x 10+the subframe sequence number, or may be the transmission times of the data signal. For example, i=0 represents transmission for the first time, i=1 represents transmission for the second time, and so on.

Optionally, the processor 410 is further configured to obtain grouping information of a time resource, where the grouping information of the time resource includes time resource group sequence numbers of N time resource groups, and N is a positive integer; and the i is the time resource group sequence numbers.

Specifically, the processor 410 may obtain the grouping information of the time resource shown in Table 1, and the time resource group sequence numbers of N time resource groups, where N is a positive integer, and the grouping information of the time resource may be sent by a third party, for example, a base station, or by a receive end, or may be preset in the user equipment, which is not limited in this embodiment of the present invention.

It should be noted that the physical resource may be a resource element (English full name: Resource Element, RE for short) or a physical resource block (English full name: Physical Resource Block, PRB for short); the frequency resource may be a carrier or a subcarrier; and the time resource may be a subframe, a timeslot, or the like. In D2D communication, for example, in a VoIP (Voice over Internet Protocol) voice service, a data transmission pattern is to transmit, in 20 milliseconds (ms), that is, 20 subframes, information of 44 bytes (Bytes), 352 bits (bit) in total, including: payload (payload) information of 328 bits and cyclic redundancy check (English full name: Cyclic Redundancy Check, CRC for short) information of 24 bits. To ensure coverage of the VoIP voice service, a VoIP data packet needs to be transmitted for multiple times, for example, five times, in a period of 20 ms. That is, multiple subframes in the 20 subframes need to be occupied to send the VoIP data packet.

Referring to Table 1, in this step, a time resource, for example, 20 subframes, used to transmit the data signal may be classified into five groups. Each time resource group includes four subframes, each subframe includes five frequency resources, and there are 20 physical resources in total. Therefore, in each time resource group, time resource numbers are 0,1, . . . , 3, frequency resource numbers are 0, 1, . . . , 4, physical resource numbers are 0, 1, . . . , 19, and time resource group sequence numbers are 0, 1, . . . , 4. That is, in the 20 subframes, the VoIP data packet is sent by using any subframe in each time resource group, five subframes in total, so as to ensure the coverage of the VoIP voice service.

Specifically, the i may be the time resource group sequence numbers 0, 1, . . . , 4. For example, if transmission occurs in a zeroth group, the i=0 is used, and if transmission occurs in a first group, the i=1 is used.

Optionally, the $N_{sb}$ may be total transmission times of the data signal.

Specifically, referring to Table 1, the data signal is transmitted for five times in total, and therefore $N_{sb}=5$.

Optionally, the processor 410 obtains the grouping information of the time resource according to a correspondence between the time resource number and the time resource, where the correspondence between the time resource number and the time resource is preset, fed back by a receive end, or provided by a third party, for example, a base station.

Optionally, the grouping information of the time resource includes: the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, . . . , k−1, frequency resource numbers are 0, 1, . . . , t−1, physical resource numbers are 0, 1, . . . , k×t−1, and time resource group sequence numbers are 0, 1, . . . , 4.

Therefore, in this embodiment of the present invention, frequency selective fading can be effectively avoided, and a frequency diversity gain can be obtained.

It should be understood that in this embodiment of the present invention, the processor 410 may be a central processing unit (Central Processing Unit, "CPU" for short), or the processor 410 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may further be any conventional processor, or the like.

The memory 420 may include a read-only memory and a random access memory, and provide an instruction and data to the processor 410. A part of the memory 420 may further include a non-volatile random access memory. For example, the memory 420 may further store information of a device type.

The bus system 430 may further include a power bus, a control bus, a status signal bus, and the like, in addition to a data bus. However, for clear description, various types of buses in the figure are marked as the bus system 430.

In an implementation process, the steps in the foregoing methods may be completed by using an integrated logic circuit of hardware in the processor 410 or an instruction in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 420, and a processor 410 reads information in the memory 420 and completes the steps in the foregoing methods in combination with hardware of the processor. To avoid repetition, details are not described herein.

It should be understood that the user equipment 300 and the user equipment 400 according to the embodiments of the present invention may be corresponding to the first user equipment in the data transmission method in the embodiments of the present invention. The foregoing and other operations and/or functions of the modules in the user equipment 300 and the user equipment 400 each are used to implement corresponding procedures of the methods in FIG. 1. For brevity, details are not described herein.

In addition, a computer readable media (or medium) is further provided, including a computer readable instruction that performs, upon being executed, the following operation: performing the operations of S110 to S130 in the method in the foregoing embodiment.

In addition, a computer program product is further provided, including the foregoing computer readable medium.

The foregoing describes in detail the user equipment serving as a transmit end according to this embodiment of the present invention with reference to FIG. 3 and FIG. 4. The following describes in detail the user equipment serving as a receive end according to an embodiment of the present invention with reference to FIG. 5 and FIG. 6.

Figure 5:
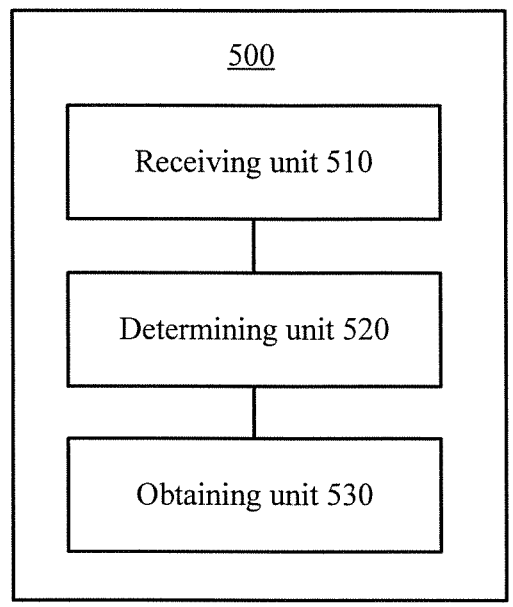
FIG. 5 is a schematic block diagram of user equipment according to yet another embodiment of the present invention.

FIG. 5 shows a schematic block diagram of user equipment 500 according to an embodiment of the present invention. As shown in FIG. 5, the user equipment 500 includes a receiving unit 510, a determining unit 520, and an obtaining unit 530.

The receiving unit 510 is configured to receive an indication signal, for example, a scheduling assignment (English full name: Scheduling Assignment, SA for short) signal, where the indication signal indicates frequency resource numbers of one or more physical resources.

Specifically, the receiving unit 510 may receive the indication signal according to scheduling information of a base station, which is not limited in this embodiment of the present invention. For example, the receiving unit 510 may receive the indication signal according to an indication of a transmit end, or receive the indication signal according to pre-configuration.

The determining unit 520 is configured to determine, according to the frequency resource numbers, a frequency resource (that is, a frequency resource number) occupied by a data signal.

It should be noted that the determining unit 520 may obtain, by using multiple methods, a time resource number occupied by the data signal, and the data signal may occupy one or more frequency resource numbers, which is not limited in this embodiment of the present invention.

The obtaining unit 530 is configured to obtain the data signal according to the frequency resource.

It should be noted that the obtaining unit 530 may obtain, by using multiple methods, the data signal. This is not limited in this embodiment of the present invention.

The foregoing describes in detail the user equipment according to this embodiment of the present invention with reference to FIG. 5.

The following describes this embodiment of the present invention in more detail with reference to a specific example. It should be noted that, the example in FIG. 5 is intended only to help persons skilled in the art understand the embodiments of the present invention, but is not intended to restrict the embodiments of the present invention to a specific numerical value or a specific scenario that is illustrated. Persons skilled in the art certainly can make various equivalent modifications or changes according to the given example in FIG. 5, which also fall within the scope of the embodiments of the present invention.

According to this embodiment of the present invention, indicating, by the indication signal, the frequency resource numbers of one or more physical resources includes: including, by the indication signal, a resource pattern of transmission (English full name: Resource Pattern of Transmission, RPT for short) field, where the resource pattern of transmission field is used to indicate the frequency resource numbers of one or more physical resources.

Specifically, for example, two bits 00 of the RPT field indicate a frequency resource number 0. Two bits 01 of the RPT field indicate a frequency resource number 1. Two bits 10 of the RPT field indicate a frequency resource number 2. Two bits 11 of the RPT field indicate a frequency resource number 3. Other frequency resource numbers may further be represented by more bits of the RPT field, and this is not limited in this embodiment of the present invention.

Optionally, the determining unit 520 is specifically configured to determine, according to the formula (1), a frequency resource number $\tilde{n}_{PRB}(i)$ occupied by the data signal.

Optionally, the determining unit 520 is specifically configured to determine, according to the formula (2), a frequency resource number $\tilde{n}_{PRB}(i)$ occupied by the data signal.

It should be understood that the frequency resource adjustment value $f_{hop}(i)$ or $f_m(i)$ may be a random number or any value determined in another manner, which is not limited in this embodiment of the present invention.

Optionally, when $N_{sb}=1$, $f_{hop}(i)=0$; when $N_{sb}=2$, the $f_{hop}(i)$ is determined according to the formula (3); and when $N_{sb}>2$, the $f_{hop}(i)$ is determined according to the formula (4).

Optionally, when $N_{sb}=1$, $f_m(i)=\text{mod}(i, 2)$; and when $N_{sb}>1$, $f_m(i)=c(i \cdot 10)$.

In addition, in the foregoing embodiment, there is an interval of at least M frequency resources between any two frequency resources, which can therefore ensure that a frequency diversity gain is obtained.

Optionally, an initialization sequence of the pseudo random sequence c(k) is $c_{init}=N_{ID}^{cell}$, or $c_{init}=510$, or $c_{init}=2^9 \cdot \mathrm{mod}(n_f,4)+N_{ID}^{cell}$, or $c_{init}=2^9 \cdot \mathrm{mod}(n_f,4)+510$, where $N_{ID}^{cell}$ is an identifier of a physical layer cell, and $n_f$ is a system frame number.

Optionally, the i may be a timeslot sequence number, a subframe sequence number, or transmission times of the data signal.

Specifically, the i may be a timeslot sequence number in a data subframe (that is, 10 milliseconds), or may be a subframe sequence number in a time resource pool of any length, or may be a data frame number x 10+the subframe sequence number, or may be the transmission times of the data signal. For example, i=0 represents transmission for the first time, i=1 represents transmission for the second time, and so on.

Optionally, the obtaining unit 530 is further configured to obtain grouping information of a time resource, where the grouping information of the time resource includes time resource group sequence numbers of N time resource groups, and N is a positive integer; and the i is the time resource group sequence numbers.

It should be understood that the grouping information of the time resource may be sent by a third party, for example, a base station, or by a transmit end, or may be preset in the user equipment, which is not limited in this embodiment of the present invention.

Specifically, the obtaining unit 530 may obtain the grouping information of the time resource shown in Table 1, and the time resource group sequence numbers of N time resource groups, where N is a positive integer.

It should be noted that the physical resource may be a resource element (English full name: Resource Element, RE for short) or a physical resource block (English full name: Physical Resource Block, PRB for short) ; the frequency resource may be a carrier or a subcarrier; and the time resource may be a subframe, a timeslot, or the like. In D2D communication, for example, in a VoIP (Voice over Internet Protocol) voice service, a data transmission pattern is to transmit, in 20 milliseconds (ms), that is, 20 subframes, information of 44 bytes (Bytes), 352 bits (bit) in total, including: payload (payload) information of 328 bits and cyclic redundancy check (English full name: Cyclic Redundancy Check, CRC for short) information of 24 bits. To ensure coverage of the VoIP voice service, a VoIP data packet needs to be transmitted for multiple times, for example, five times, in a period of 20 ms. That is, multiple subframes in the 20 subframes need to be occupied to send the VoIP data packet.

Referring to Table 1, in this step, a time resource, for example, 20 subframes, used to transmit the data signal may be classified into five groups. Each time resource group includes four subframes, each subframe includes five frequency resources, and there are 20 physical resources in total. Therefore, in each time resource group, time resource numbers are 0, 1, . . . , 3, frequency resource numbers are 0, 1, . . . , 4, physical resource numbers are 0, 1, . . . , 19, and time resource group sequence numbers are 0, 1, . . . , 4. That is, in the 20 subframes, the VoIP data packet is sent by using any subframe in each time resource group, five subframes in total, so as to ensure the coverage of the VoIP voice service.

Specifically, the i may be the time resource group sequence numbers 0, 1, . . . , 4. For example, if transmission occurs in a zeroth group, the i=0 is used, and if transmission occurs in a first group, the 1=1 is used.

Optionally, the $N_{sb}$ may be total transmission times of the data signal.

Specifically, referring to Table 1, the data siyiial is transmitted for five times in total, and therefore $N_{sb}$=5.

Optionally, the obtaining unit 530 is specifically configured to obtain the grouping information of the time resource according to a correspondence between the time resource number and the time resource, where the correspondence between the time resource number and the time resource is preset, fed back by a receive end, or provided by a third party, for example, a base station.

Optionally, the grouping information of the time resource includes: the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, . . . , k−1, frequency resource numbers are 0, 1, . . . , t−1, physical resource numbers are 0 , 1, . . . , k×t−1, and time resource group sequence numbers are 0, 1, . . . , 4.

According to this embodiment of the present invention, the obtaining unit 530 is specifically configured to determine, according to a correspondence between the frequency resource number occupied by the data signal and the frequency resource, a frequency resource corresponding to the frequency resource number; and obtain the data signal from the frequency resource occupied by the data signal, where the correspondence between the frequency resource number occupied by the data signal and the frequency resource is preset, or obtained from a transmit end, or obtained from a third party, for example, a base station.

Optionally, the receiving unit 510 is specifically configured to receive the correspondence between the frequency resource number and the frequency resource.

Therefore, in this embodiment of the present invention, frequency selective fading can be effectively avoided, and a frequency diversity gain can be obtained.

Figure 6:
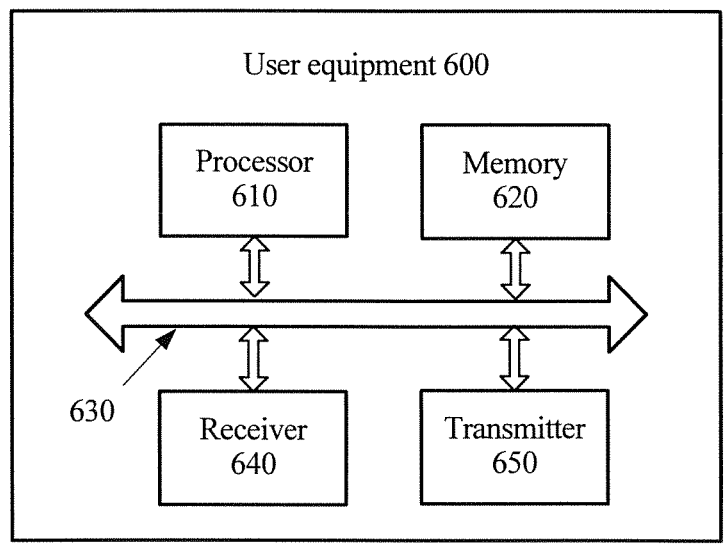
FIG. 6 is a schematic block diagram of user equipment according to yet another embodiment of the present invention.

From a perspective of another implementation manner, as shown in FIG. 6, an embodiment of the present invention further provides user equipment 600, where the user equipment 600 includes a processor 610, a memory 620, a bus system 630, a receiver 640, and a transmitter 650. The processor 610, the memory 620, the receiver 640, and the transmitter 650 are connected to each other by using the bus system 630. The memory 620 is configured to store an instruction, and the processor 610 is configured to execute the instruction stored in the memory 620, so as to control the receiver 640 to receive a signal, or an instruction, or a message, and control the transmitter 650 to send a signal, or an instruction, or a message. The processor 610 is configured to determine, according to frequency resource numbers that are of one or more physical resources and that are received by the receiver 640, a frequency resource (that is, a frequency resource number) occupied by a data signal, and obtain the data signal according to the frequency resource; and the receiver 640 is configured to receive an indication signal, for example, a scheduling assignment (English full name: Scheduling Assignment, SA for short) signal, where the indication signal indicates the frequency resource numbers of one or more physical resources.

The foregoing describes in detail the user equipment according to this embodiment of the present invention with reference to FIG. 6.

The following describes this embodiment of the present invention in more detail with reference to a specific example. It should be noted that, the example in FIG. 6 is intended only to help persons skilled in the art understand the embodiments of the present invention, but is not intended to restrict the embodiments of the present invention to a specific numerical value or a specific scenario that is illustrated. Persons skilled in the art certainly can make various equivalent modifications or changes according to the given example in FIG. 6, which also fall within the scope of the embodiments of the present invention.

According to this embodiment of the present invention, indicating, by the indication signal, the frequency resource numbers of one or more physical resources includes: including, by the indication signal, a resource pattern of transmission (English full name: Resource Pattern of Transmission, RPT for short) field, where the resource pattern of transmission field is used to indicate the frequency resource numbers of one or more physical resources.

Specifically, for example, two bits 00 of the RPT field indicate a frequency resource number 0; two bits 01 of the RPT field indicate a frequency resource number 1; two bits 10 of the RPT field indicate a frequency resource number 2; and two bits 11 of the RPT field indicate a frequency resource number 3. Other frequency resource numbers may further be represented by more bits of the RPT field, which is not limited in this embodiment of the present invention.

Optionally, the processor 610 determines, according to the formula (1), a frequency resource number $\tilde{n}_{PRB}(i)$ occupied by the data signal.

Optionally, the processor 610 determines, according to the formula (2), a frequency resource number $\tilde{n}_{PRB}(i)$ occupied by the data signal.

It should be understood that the frequency resource adjustment value $f_{hop}(i)$ or $f_m(i)$ may be a random number or any value determined in another manner, which is not limited in this embodiment of the present invention.

Optionally, when $N_{sb}=1$, $f_{hop}(i)=0$; when $N_{sb}$32 2, the $f_{hop}(i)$ is determined according to the formula (3); and when $N_{sb}>2$, the $f_{hop}(i)$ is determined according to the formula (4).

Optionally, when $N_{sb}=1$, $f_m(i)=\mod(i, 2)$; and when $N_{sb}>1$, $f_m(i)=c(i\cdot 10)$.

In addition, in the foregoing embodiment, there is an interval of at least M frequency resources between any two frequency resources, which can therefore ensure that a frequency diversity gain is obtained.

Optionally, an initialization sequence of the pseudo random sequence c(k) is $c_{init}=N_{ID}^{cell}$, or $c_{init}=510$, or $c_{init}=2^9\cdot\mod(n_f,4)+N_{ID}^{cell}$, or $c_{init}=2^9\cdot\mod(n_f,4)+510$, where $N_{ID}^{cell}$ is an identifier of a physical layer cell, and $n_f$ is a system frame number.

Optionally, the i may be a timeslot sequence number, a subframe sequence number, or transmission times of the data signal.

Specifically, the i may be a timeslot sequence number in a data subframe (that is, 10 milliseconds), or may be a subframe sequence number in a time resource pool of any length, or may be a data frame number x 10+the subframe sequence number, or may be the transmission times of the data signal. For example, i=0 represents transmission for the first time, i=1 represents transmission for the second time, and so on.

Optionally, the processor 610 is further configured to obtain grouping information of a time resource, where the grouping information of the time resource includes time resource group sequence numbers of N time resource groups, and N is a positive integer; and the i is the time resource group sequence numbers.

It should be understood that the grouping information of the time resource may be sent by a third party, for example, a base station, or by a transmit end, or may be preset in the user equipment, which is not limited in this embodiment of the present invention.

Specifically, the processor 610 may obtain the grouping information of the time resource shown in Table 1, and the time resource group sequence numbers of N time resource groups, where N is a positive integer.

It should be noted that the physical resource may be a resource element (English full name: Resource Element, RE for short) or a physical resource block (English full name: Physical Resource Block, PRB for short) ; the frequency resource may be a carrier or a subcarrier ; and the time resource may be a subframe, a timeslot, or the like. In D2D communication, for example, in a VoIP (Voice over Internet Protocol) voice service, a data transmission pattern is to transmit, in 20 milliseconds (ms), that is, 20 subframes, information of 44 bytes (Bytes), 352 bits (bit) in total, including: payload (payload) information of 328 bits and cyclic redundancy check (English full name: Cyclic Redundancy Check, CRC for short) information of 24 bits. To ensure coverage of the VoIP voice service, a VoIP data packet needs to be transmitted for multiple times, for example, five times, in a period of 20 ms. That is, multiple subframes in the 20 subframes need to be occupied to send the VoIP data packet.

Referring to Table 1, in this step, a time resource, for example, 20 subframes, used to transmit the data signal may be classified into five groups. Each time resource group includes four subframes, each subframe includes five frequency resources, and there are 20 physical resources in total. Therefore, in each time resource group, time resource numbers are 0, 1, . . . , 3, frequency resource numbers are 0, 1, . . . , 4, physical resource numbers are 0, 1, . . . , 19, and time resource group sequence numbers are 0, 1, . . . , 4. That is, in the 20 subframes, the VoIP data packet is sent by using any subframe in each time resource group, five subframes in total, so as to ensure the coverage of the VoIP voice service.

Specifically, the i may be the time resource group sequence numbers 0, 1, . . . , 4. For example, if transmission occurs in a zeroth group, the i=0 is used, and if transmission occurs in a first group, the i=1 is used.

Optionally, the $N_{sb}$ is total transmission times of the data signal.

Specifically, referring to Table 1, the data signal is transmitted for five times in total, and therefore $N_{sb}=5$.

Optionally, the processor 610 obtains the grouping information of the time resource according to a correspondence between the time resource number and the time resource, where the correspondence between the time resource number and the time resource is preset, fed back by a receive end, or provided by a third party, for example, a base station.

Optionally, the grouping information of the time resource includes: the time resource, for example, 20 subframes, which are classified into five groups. Each time resource group includes k time resources, each time resource includes t frequency resources, and there are k×t physical resources in total, where k and t are positive integers. Therefore, in each time resource group, time resource numbers of the physical resources are 0, 1, . . . , k−1, frequency resource numbers are 0, 1, . . . , t−1, physical resource numbers are 0, 1, . . . , k×t−1, and time resource group sequence numbers are 0, 1, . . . , 4.

According to this embodiment of the present invention, the processor 610 determines, according to a correspondence between the frequency resource number occupied by the data signal and the frequency resource, a frequency resource corresponding to the frequency resource number, and obtains the data signal from the frequency resource occupied by the data signal, where the correspondence between the frequency resource number occupied by the data signal and the frequency resource is preset, or obtained from a transmit end, or obtained from a third party, for example, a base station.

Optionally, the receiver 640 receives the correspondence between the frequency resource number and the frequency resource.

Therefore, in this embodiment of the present invention, frequency selective fading can be effectively avoided, and a frequency diversity gain can be obtained.

It should be understood that in this embodiment of the present invention, the processor 610 may be a central processing unit (Central Processing Unit, "CPU" for short), or the processor 610 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may further be any conventional processor, or the like.

The memory 620 may include a read-only memory and a random access memory, and provide an instruction and data to the processor 610. A part of the memory 620 may further include a non-volatile random access memory. For example, the memory 620 may further store information of a device type.

The bus system 630 may further include a power bus, a control bus, a status signal bus, and the like, in addition to a data bus. However, for clear description, various types of buses in the figure are marked as the bus system 630.

In an implementation process, the steps in the foregoing methods may be completed by using an integrated logic circuit of hardware in the processor 610 or an instruction in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 620, and a processor 610 reads information in the memory 620 and completes the steps in the foregoing methods in combination with hardware of the processor. To avoid repetition, details are not described herein.

It should be understood that the user equipment 500 and the user equipment 600 according to the embodiments of the present invention may be corresponding to the second user equipment in the data transmission method in the embodiments of the present invention. The foregoing and other operations and/or functions of the modules in the user equipment 500 and the user equipment 600 each are used to implement corresponding procedures of the methods in FIG. 2. For brevity, details are not described herein again.

In addition, a computer readable media (or medium) is further provided, including a computer readable instruction that performs, upon being executed, the following operation: performing the operations of S210 to S230 in the method in the foregoing embodiment.

In addition, a computer program product is further provided, including the foregoing computer readable medium.

It should be noted that: the signal mentioned herein includes but is not limited to an indication, information, signaling, a message, or the like, which is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
sending, by first user equipment, an indication signal, wherein the indication signal indicates frequency resource numbers of one or more physical resources;
determining, by the first user equipment according to the frequency resource numbers, a frequency resource occupied by a data signal, including determining, by the first user equipment according to a formula $\tilde{n}_{PRB}(i) = \mathrm{mod}(\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i), N_{RB}^{sb} \cdot N_{sb})$, a frequency resource number $\tilde{n}_{PRB}(i)$ occupied by the data signal, wherein: mod( ) is a mod function; a value of i is 0 or a positive integer; $\tilde{n}_{VRB}$ is a frequency resource number indicated by the indication signal or any frequency resource number of multiple frequency resource numbers indicated by the indication signal, and is 0 or a positive integer; $N_{Sb}$ is a quantity of frequency resources, and is a positive integer; $N_{RB}^{sb}$ is a quantity of physical resources comprised in each frequency resource, and is a positive integer; and $f_{hop}(i)$ and $f_m(i)$ are frequency resource adjustment values, and are 0 or positive integers; and
sending, by the first user equipment, the data signal by using the frequency resource.

2. A data transmission method, comprising:
sending, by first user equipment, an indication signal, wherein the indication signal indicates frequency resource numbers of one or more physical resources;
determining, by the first user equipment according to the frequency resource numbers, a frequency resource occupied by a data signal, including determining, by the first user equipment according to a formula $\tilde{n}_{PRB}(i) = \mathrm{mod}(\tilde{n}_{VRB} + f_{hop}(i) \cdot N_{RB}^{sb}, N_{RB}^{sb} \cdot N_{sb})$, a frequency resource number $\tilde{n}_{PRB}(i)$ occupied by the data signal, wherein: mod( ) is a mod function; a value of i is 0 or a positive integer; $\tilde{n}_{VRB}$ is the frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources comprised in each frequency resource, and is a positive integer; and $f_{hop}(i)$ is a frequency resource adjustment value, and is 0 or a positive integer; and
sending, by the first user equipment, the data signal by using the frequency resource.

3. The method according to claim 1, wherein when $N_{sb}=1$, $f_{hop}(i)=0$, when $$N_{sb} = 2,\ f_{hop}(i) = \mathrm{mod}\!\left(f_{hop}(i-1) + \sum_{k=i\cdot 10+1}^{i\cdot 10+9} c(k) \times 2^{k-(i\cdot 10+1)},\ N_{sb}\right),$$

and when $N_{sb}>2$, $$f_{hop}(i) = \mathrm{mod}\!\left(f_{hop}(i-1) + \mathrm{mod}\!\left(\sum_{k=i\cdot 10+1}^{i\cdot 10+9} c(k) \times 2^{k-(i\cdot 10+1)},\ N_{sb}-M\right) + M,\ N_{sb}\right),$$

wherein M is 0 or a positive integer not greater than $N_{sb}-2$, c(k) is a pseudo random sequence, and $f_{hop}(-1)=0$.

4. The method according to claim 1, wherein an initialization sequence of the pseudo random sequence c(k) is $c_{init}=N_{ID}^{cell}$, or $c_{init}=510$, or $c_{init}=2^9 \cdot \mathrm{mod}(n_f,4)+N_{ID}^{cell}$, or $c_{init}=2^9 \cdot \mathrm{mod}(n_f,4)+510$, wherein $N_{ID}^{cell}$ is an identifier of a physical layer cell, and $n_f$ is a system frame number.

5. The method according to claim 1, wherein the i is a timeslot sequence number, a subframe sequence number, or transmission times of the data signal.

6. The method according to claim 1, further comprising:
obtaining, by the first user equipment, grouping information of a time resource, wherein the grouping information of the time resource comprises time resource group sequence numbers of N time resource groups, and N is a positive integer; and the i is the time resource group sequence numbers.

7. The method according to claim 1, wherein the $N_{sb}$ is total transmission times of the data signal.

8. The method according to claim 1, wherein indicating, by the indication signal, the frequency resource numbers of one or more physical resources comprises:
comprising, by the indication signal, a resource pattern of transmission field, wherein the resource pattern of transmission field is used to indicate the frequency resource numbers of one or more physical resources.

9. A user equipment comprising:
a memory; and
a processor in communication with the memory, wherein the processor is configured to:
send an indication signal, wherein the indication signal indicates frequency resource numbers of one or more physical resources;
determine, according to the frequency resource numbers, a frequency resource occupied by a data signal, including determining, according to a formula $\tilde{n}_{PRB}(i) = \mathrm{mod}(\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i), N_{RB}^{sb} \cdot N_{sb})$,
a frequency resource number $\tilde{n}_{PRB}(i)$ occupied by the data signal, wherein: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources comprised in each frequency resource, and is a positive integer; and $f_{hop}(i)$ and $f_m(i)$ are frequency resource adjustment values, and are 0 or positive integers; and
send the data signal by using the frequency resource.

10. A user equipment comprising:
a memory; and
a processor in communication with the memory, wherein the processor is configured to:
send an indication signal, wherein the indication signal indicates frequency resource numbers of one or more physical resources;
determine, according to the frequency resource numbers, a frequency resource occupied by a data signal, including determining, according to a formula $\tilde{n}_{PRB}(i)=\mathrm{mod}(\tilde{n}_{VRB}+f_{hop}(i)\cdot N_{RB}^{sb}, N_{RB}^{sb}\cdot N_{sb})$, a frequency resource number $\tilde{n}_{PRB}(i)$ occupied by the data signal, wherein: mod( ) is a mod function; a value of i is 0 or a positive integer; $\tilde{n}_{VRB}$ is a frequency resource number indicated by the indication signal, or any frequency resource number of multiple frequency resource numbers indicated by the indication signal, and is 0 or a positive integer; $N_{sb}$ is a quantity of frequency resources, and is a positive integer; $N_{RB}^{sb}$ is a quantity of physical resources comprised in each frequency resource, and is a positive integer; and $f_{hop}(i)$ is a frequency resource adjustment value, and is 0 or a positive integer; and
send the data signal by using the frequency resource.

11. The user equipment according to claim 9, wherein when $N_{sb}=1$, $f_{hop}(i)=0$, when $N_{sb}=2$, $$f_{hop}(i) = \mathrm{mod}\left(f_{hop}(i-1) + \sum_{k=i\cdot 10+1}^{i\cdot 10+9} c(k)\times 2^{k-(i\cdot 10+1)}, N_{sb}\right),$$

and when $N_{sb}>2$, $$f_{hop}(i) = \mathrm{mod}\left(f_{hop}(i-1) + \mathrm{mod}\left(\sum_{k=i\cdot 10+1}^{i\cdot 10+9} c(k)\times 2^{k-(i\cdot 10+1)}, N_{sb}-M\right) + M, N_{sb}\right),$$

wherein M is 0 or a positive integer not greater than $N_{sb}-2$, c(k) is a pseudo random sequence, and $f_{hop}(-1)=0$.

12. The user equipment according to claim 9, wherein an initialization sequence of the pseudo random sequence c(k) is $c_{init}=N_{ID}^{cell}$, or $c_{init}=510$, or $c_{init}=2^9\cdot\mathrm{mod}(n_f,4)+N_{ID}^{cell}$, or $c_{init}=2^9\cdot\mathrm{mod}(n_f,4)+510$, wherein $N_{ID}^{cell}$ is an identifier of a physical layer cell, and $n_f$ is a system frame number.

13. The user equipment according to claim 9, wherein the i is a timeslot sequence number, a subframe sequence number, or transmission times of the data signal.

14. The user equipment according to claim 9, further comprising:
an obtaining unit, configured to obtain grouping information of a time resource, wherein the grouping information of the time resource comprises time resource group sequence numbers of N time resource groups, and N is a positive integer; and the i is the time resource group sequence numbers.

15. The user equipment according to claim 9, wherein the $N_{sb}$ is total transmission times of the data signal.

16. The user equipment according to claim 9, wherein indicating, by the indication signal, the frequency resource numbers of one or more physical resources comprises:
comprising, by the indication signal, a resource pattern of transmission field, wherein the resource pattern of transmission field is used to indicate the frequency resource numbers of one or more physical resources.

* * * * *